March 10, 1953     W. T. STEPHENS     2,630,825
RELIEF VALVE
Filed March 5, 1945     3 Sheets-Sheet 1
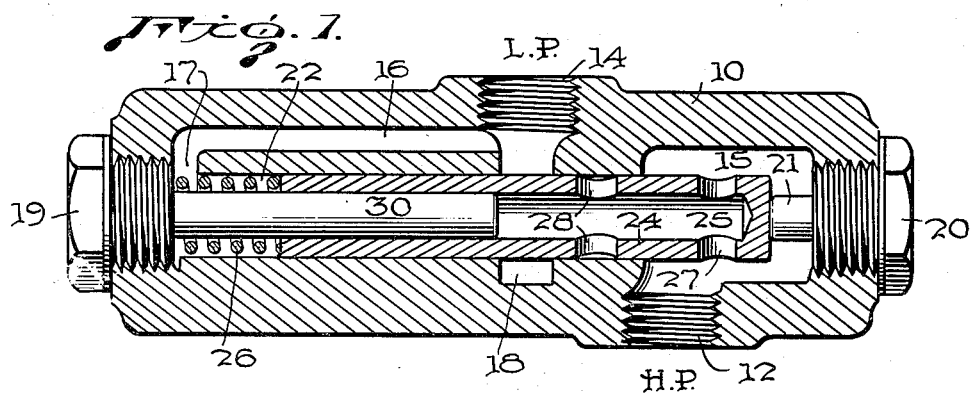
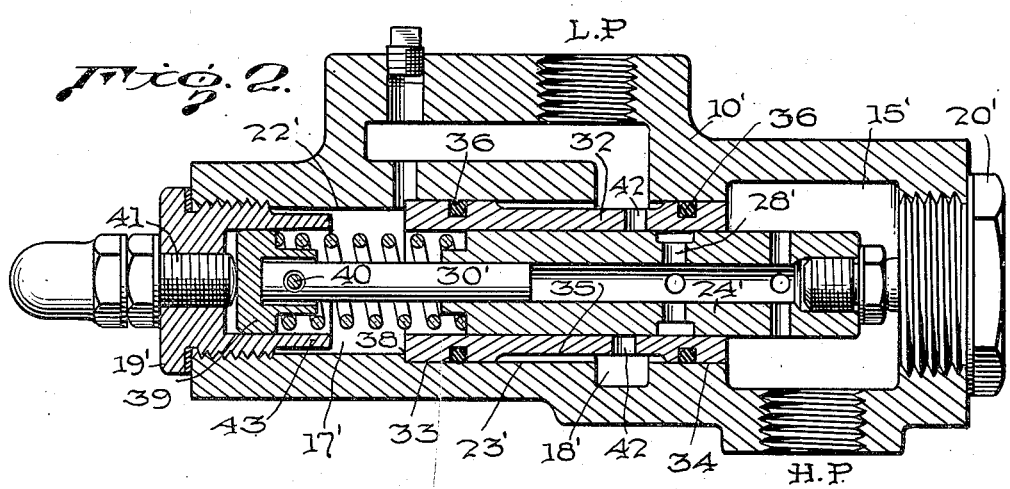
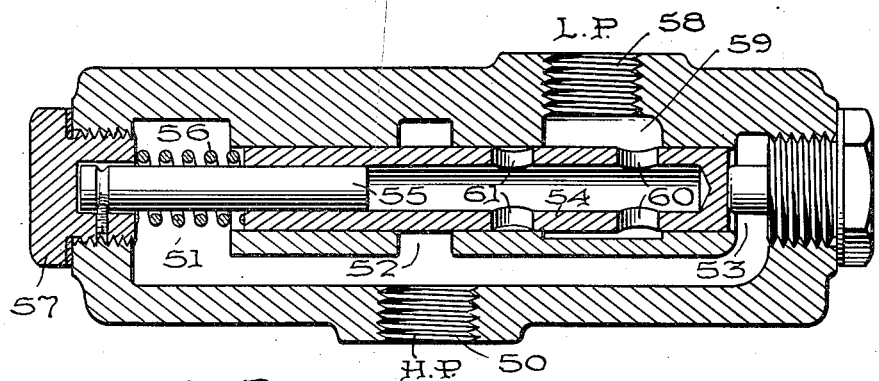
Inventor
WILLIAM T. STEPHENS
By Leech & Radue
Attorneys

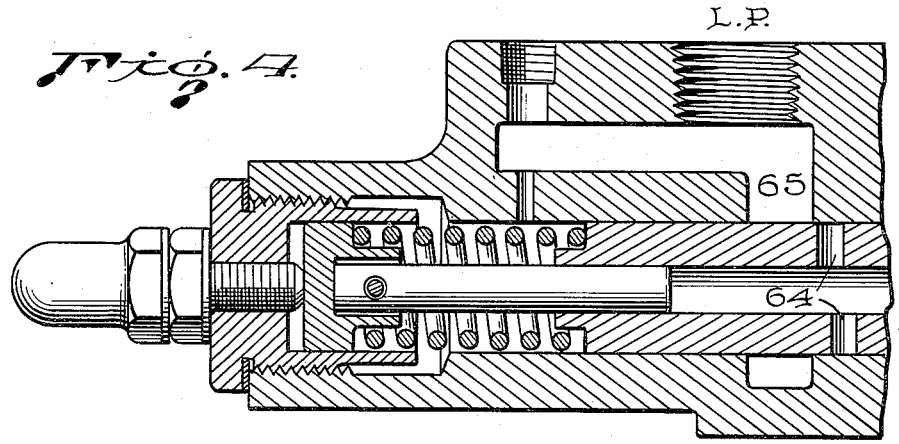
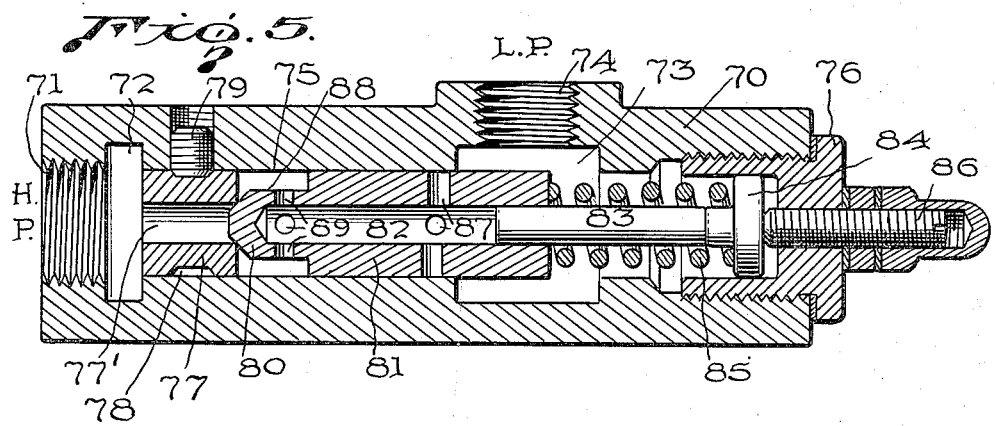
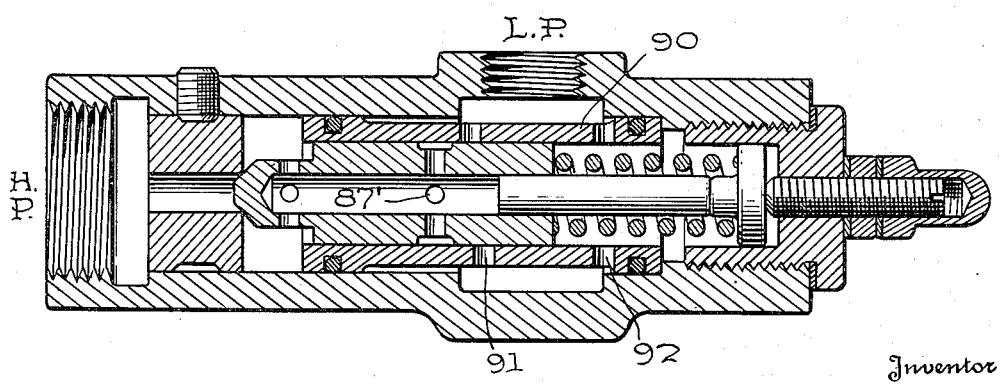

March 10, 1953 W. T. STEPHENS 2,630,825
RELIEF VALVE

Filed March 5, 1945 3 Sheets-Sheet 3

Inventor
WILLIAM T. STEPHENS
By Leech & Radue
Attorneys

Patented Mar. 10, 1953

2,630,825

UNITED STATES PATENT OFFICE 2,630,825

RELIEF VALVE

William T. Stephens, Cleveland, Ohio, assignor, by mesne assignments, to The New York Air Brake Company, New York, N. Y., a corporation of New Jersey Application March 5, 1945, Serial No. 580,961

15 Claims. (Cl. 137—494)

This invention relates to pressure relief valves and more particularly to such valves for use in hydraulic systems to prevent the overloading of the pump or other source of liquid supply.

It is a general object of the present invention to provide novel and improved forms of hydraulic pressure relief valves.

More particularly, it is an object of the invention to provide a hydraulic relief valve capable of easily and smoothly handling large volumes of hydraulic fluids and which is extremely simple in construction.

An important object of the invention consists in the formation of a relief valve adapted to have the plunger arranged in a housing between high and low pressure chambers and which is of uniform external diameter for simplicity in construction of both the movable portion of the valve and the housing.

An important feature of the invention consists in the novel arrangement of the ports of a relief valve whereby it is capable of handling large volumes of oil under the control of an extremely small light weight spring and in which coaxial bores of different diameters are entirely avoided in the housing.

Another important feature of the invention resides in the use of a small secondary plunger substantially entirely housed in the main valve plunger and adapted to provide the effective area against which the excess pressure operates to move the valve to open position against a biasing spring.

A still further feature of the invention resides in the arrangement of a sleeve or lining for the valve housing bore constructed of a material having substantially the same coefficient of thermal expansion as that of the plunger and substantially insulated from the housing whereby sticking of the plunger is prevented when the hydraulic liquid is heated from use.

Still another important feature of this invention consists in the provision of a two-stage relief valve providing a double sealing of the pressure fluid which is released in two stages, the opening of the first of which admits pressure liquid for the subsequent operation of the second. This form of the invention is subject to the improvements delineated in the preceding paragraph.

Other and further objects and features of the invention will be more apparent to those skilled in the art upon a consideration of the accompanying drawings and following specification wherein are disclosed several exemplary embodiments of the invention with the understanding that such modifications and combinations thereof may be made as fall within the scope of the appended claims without departing from the spirit of the invention.

In said drawings:

Fig. 1 is a longitudinal section through one embodiment of a valve constructed in accordance with the present invention;

Fig. 2 is a view like Fig. 1 of a similar valve but modified by the application of a sleeve or liner;

Fig. 3 is a view like Fig. 1 of a modified valve construction;

Fig. 4 illustrates a modification of the valve of Figs. 1 and 2 showing a simplified method of graduating the rate of discharge;

Fig. 5 illustrates in longitudinal central section a simplified embodiment of a two-stage relief valve;

Figure 7:
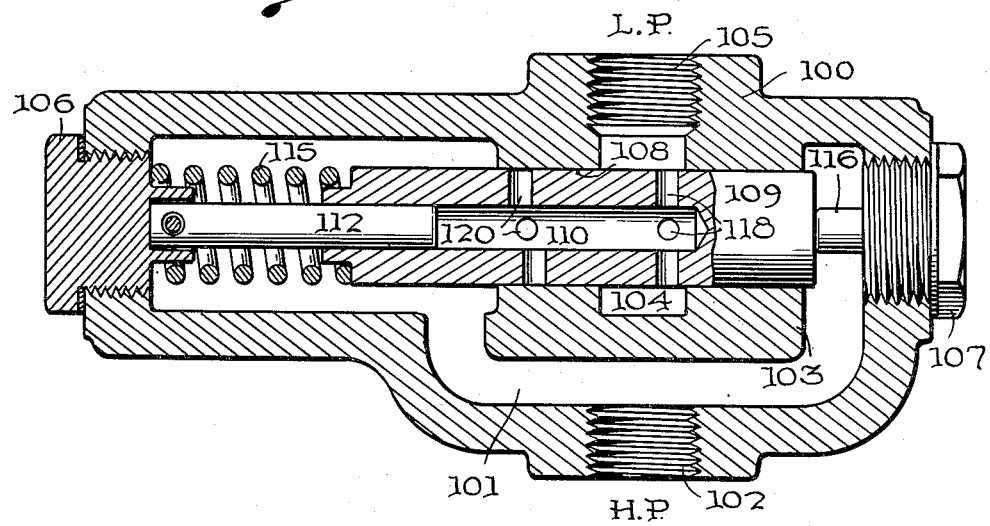

Fig. 6 discloses the valve of Fig. 5 provided with a liner of similar coefficient of expansion to that of the plunger;

Fig. 7 depicts a still further embodiment of the relief valve; and

Figure 8:
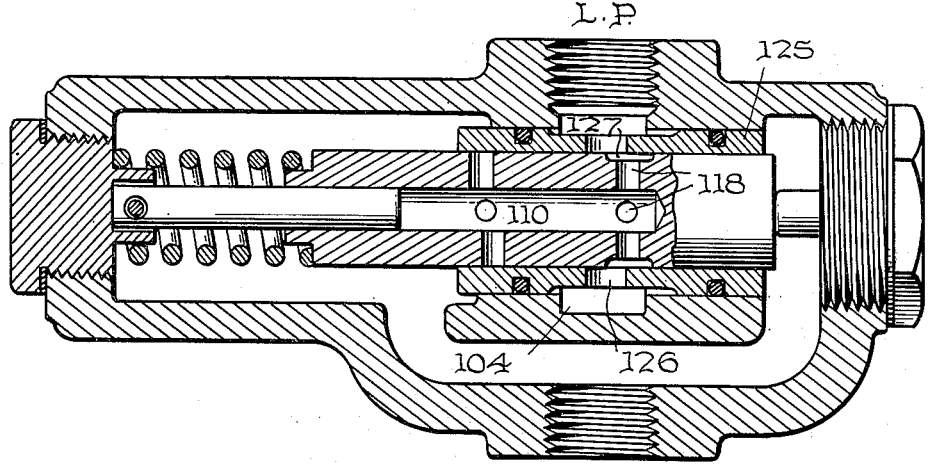

Fig. 8 illustrates the valve of Fig. 7 equipped with the equal expansion liner or sleeve.

In hydraulic control systems of the type using a reservoir for the hydraulic liquid and a positive displacement pump for supplying the same under high pressure to a hoist, ram or similar force exerting device, there are occasions in the operation when the flow of liquid from the pump is shut off or seriously hampered in flow so that the pressure at the pump or elsewhere in the system becomes too great. Under such conditions, if relief is not provided, the pump or some of its driving mechanism may be damaged. In addition the pump wears too rapidly when operated against extremely high pressures and consumes too much power.

In accordance with the present invention novel relief valves are provided, each of which is adapted to be inserted between the high pressure side of the pump and the reservoir, which will open at a predetermined and adjusted high pressure to relieve the same by permitting the pump to discharge directly to the tank or reservoir and which will automatically close when the cause of the excess pressure is removed.

The valve illustrated in Fig. 1 is enclosed in a housing 10 of unitary type, intended for piping into a system including a pump for providing high pressure liquid, a reservoir or tank, and a control valve for directing liquid to and from some translating means actuated by the same.

The housing is provided with a port 12 for connection to the high pressure side of the system preferably between the pump and the control valve and with a port 14 for connection to the reservoir for passing the liquid relieved from the pump thereto. Obviously the relief valve in this and other embodiments of the invention can equally as well be incorporated directly into the housing of a control or similar valve or can be incorporated in a housing adapted for mounting adjacent to and having direct port connections with a multiple type of valve system.

In the housing the high pressure port 12 communicates with a high pressure chamber 15 at the right, while the cored passage 16 from low pressure port 14 communicates with chamber 17 near the left end of the housing and with central chamber 18. The three chambers are intersected by longitudinal bore 22 which is conveniently formed by drilling clear through the housing and blocking the threaded end portions of the bore with plugs or caps 19 and 20, the latter of which is provided on its inner face with stop plug 21.

The bore 22 is sized to provide a close working fit for valve plunger 24, which comprises a section of cylindrical rod drilled from the left for substantially its full length to provide an internal chamber or tunnel 25. The closed end of the plunger is normally maintained against stop 21 by means of a helical spring 26 compressed between the left end of the plunger and the inner end of plug 19. The chamber 25 within the plunger is at all times in communication with high pressure chamber 15 through lateral bores 27 in the plunger sufficiently spaced from the left wall of chamber 15 so as never to be eclipsed thereby in any position of the plunger. A second set of radial bores 28 are so positioned longitudinally of the plunger that in its normal or repose position as illustrated, they are closed by the walls of the housing bore intermediate chambers 15 and 18 and are adapted to be exposed in the chamber 18 when the plunger is moved toward the left against its spring under the action of excess pressure in the high pressure chamber.

The left end of the tunnel 25 is closed off against passage of fluid to low pressure chamber 17 by means of pin 30 having a close working fit in the tunnel, passing through the interior of spring 26 and loosely bearing against plug 19.

In operation, high pressure fluid fills chamber 15 and tunnel 25 and exerts force tending to move the plunger toward the left, the force acting on an effective area equivalent to that defined by the difference in diameters of pin 30 and of plunger 24. This explains the use of the pin 30, for if the left end of the plunger were merely closed the whole area of the same would be effective in moving the plunger and a much stronger spring would be needed, which would contribute a jerky, uneven action and might cause chattering. The pin 30 not only decreases the working area of the plunger, but because of its close fit therein and the fluid film between the cooperating surfaces provides a substantial measure of damping to prevent chattering.

When the pressure in chamber 15 becomes excessive the plunger is caused to move to the left until more or less of the area of radial passages 28 is exposed to low pressure chamber 18, thus venting the excess liquid and pressure until it is relieved to a safe value as determined by the area of the valve plunger and the strength of spring 26.

By having the pin 30 independent of the plug 19 and merely bearing on the same the construction of the housing is materially simplified, since no concentric boring is required and misalignment is impossible. The whole valve plunger is substantially balanced except for the annular area which provides it with the force necessary for movement. There is complete balance in a radial direction because of the use of all circumferential chambers so that there is never any lateral pressure to cause binding.

For ease in manufacturing both in moulding and machining operations, the housing of a valve such as disclosed herein is customarily made from cast iron, but the plunger is made from steel to provide the necessary strength where dimensions are quite small. In the operation of a hydraulic system, particularly where there is considerable valving of the liquid the temperature thereof increases rapidly and may reach several hundred degrees, or close to the flash point of the liquid used. Cast iron has a lower coefficient of thermal expansion than steel and if in valves subject to high temperatures some provision is not made to compensate for this, then the sliding fit of the plunger in the housing must be made quite loose when cold to prevent binding when at its maximum temperature. This contributes to serious leakage at lower temperatures and is highly undesirable in certain systems. To obviate this difficulty the valve housing may be constructed in the manner of Fig. 2, which functions in principle exactly as Fig. 1 but is provided with added refinements in the nature of spring adjustment and housing bore liners as will now appear.

The housing 10' is quite similar to that illustrated in Fig. 1 but somewhat larger in size. The bore 22' which connects the high pressure chamber 15' to low pressure chambers 17' and 18', respectively, is counterbored at its right end to enlarge the same as at 23' and in this oversized portion receives a liner or sleeve 32 formed of a material having substantially the same coefficient of expansion as that of the plunger 24'.

This sleeve or liner 32 has full dimensioned end portions 33 and 34 with a loose fit in the counterbore 23', while the central portion has its outer periphery relieved or cut away as at 35. Each of the end sections 33 and 34 is peripherally grooved to receive a resilient sealing ring 36 preferably of a circular cross-section slightly greater in diameter than the width and depth of the groove, whereby a portion of the sealing ring is squeezed out beyond the periphery of the sleeve to form a sealing engagement with the walls of the counterbore to prevent longitudinal migration of liquid. These resilient rings tend to center the sleeve in the housing with enough clearance so that expansion is independent of that of the housing. Longitudinal movement of the sleeve is prevented since it abuts shoulder 38 at the junction of the bore and counterbore, against which it is held by liquid pressure in high pressure chamber 15'.

Naturally the right closure plug 20' must be of larger diameter to permit insertion of the sleeve. A slightly modified construction is shown at the left end where the plug 19' is provided with an internal extension 43 housing a loosely sliding head 39 connected by means of a loose transverse pin 40 with the pressure pin 30'. The head has an extremely loose fit both on pin 40 and on the outside of pin 30' so no care is needed in lining up the several parts in manufacture or assembly. The head 39 is susceptible to longitudinal adjustment, for it also provides the left abutment for the spring. This adjustment is effected by means of screw 41 and appropriate lock and cap nuts.

The sleeve 32 communicates with the low pressure chamber 18' through radial passages 42, which are shown somewhat staggered in position so that they successively come into communication with radial bores 28' in the plunger. The outer ends of these bores are enlarged so that after initially overlapping the passages 42 they will not move out of communication therewith as the plunger moves farther to the left. With this arrangement greater quantities of liquid are more rapidly relieved at high pressure than at low. It will be appreciated since the sleeve and the plunger are of materials having like thermal coefficients of expansion that high temperatures will not cause binding and the normal working fits can be close to prevent leakage.

Fig. 3 illustrates a modified form of relief valve of simple construction in which high pressure inlet port 50 connects through internal passages with three high pressure chambers, 51 at the left, 52 at the center and 53 at the right, thus exposing both ends and the middle of plunger 54 to high pressure liquid. This plunger is almost identical in construction with the one illustrated in Fig. 1 and is equipped with a similar pressure pin 55 and surrounding spring 56. In this construction the pin is shown as loosely held against longitudinal movement in end cap 57. The interior of the plunger is not exposed to high pressure fluid under normal circumstances, so that the effective area of the plunger tending to compress the spring 56 is equivalent to the total area minus the annular area exposed at 51 or the area of the tunnel therein or of the pin 55. The low pressure exit port 58 connects with chamber 59, intermediate chambers 52 and 53, and the interior of the valve plunger is always in communication with this chamber through radial passages 60. A second set of radial passages 61 is normally eclipsed by the wall of the housing bore between chambers 52 and 59, but when the plunger moves toward the left the passages become exposed in chamber 52 to admit high pressure liquid for passage through the valve tunnel into low pressure port 58.

In case it is not necessary to use the auxiliary sleeve or lining as shown in Fig. 2, the valve of Fig. 1 may be caused to operate in the same manner as regards the rate of relief at different pressures by slightly modifying the plunger. This arrangement is illustrated in Fig. 4 where the normally eclipsed radial bores in the plunger are shown in a staggered arrangement at 64 so that they successively come into communication with the low pressure chamber 65. This embodiment also includes the improved spring adjusting means of Fig. 2.

Figs. 5 and 6 represent two embodiments of a modification of the invention, which may be termed a two-stage relief valve. The only difference in the two forms is that the second one is equipped with a liner or housing bore sleeve constructed in a manner similar to that illustrated in Fig. 2 and functioning for the same purpose. It is believed that a description of Fig. 5 alone will suffice to illustrate the operation of both of these forms. In this figure the housing 70 has the high pressure entrance port 71 at the left end connected with high pressure chamber 72. Low pressure chamber 73 is connected to lateral low pressure port 74. Chambers 72 and 73 are connected by a longitudinal bore 75 which is extended toward the right beyond chamber 73 and adapted to be closed by an end plug 76.

For convenience in construction a combined bore plug and valve seat device 77 is inserted in bore 75 adjacent chamber 72. It is a spool-like member having a fluid-tight fit when pressed in the bore and having central passage 77'. It is circumferentially grooved intermediate its length at 78 to receive the tip of set screw 79 threaded in the housing to hold it in position. The right end of central bore 77' provides a seat for tapered valve plug 80 integral with the left end of valve plunger 81, which has a sliding fit in bore 75. This plunger has extending therein from its right end a central tunnel or chamber 82 receiving pressure pin 83 in a manner previously described. This pin abuts against head 84 slidably received in a bore in end cap 76, the head also providing an abutment for spring 85 surrounding the pin and bearing on the right end of the plunger. The head 84 is adjustable by means of screw 86 and appropriate lock and cap nuts.

The tunnel 82 within the valve plunger is connected to the surface thereof by staggered radial passages 87 normally eclipsed by the walls of the bore 75 just to the left of low pressure chamber 73. The left end of the valve plunger is reduced in diameter at 88 to provide a chamber between it and the walls of the bore, which chamber is connected to the interior of the tunnel in the plunger by radial passages 89.

Normally the valve is positioned as shown and the spring is adjusted to maintain it closed until the pressure in chamber 72 becomes excessive, when the liquid in the area of bore 77 in the valve seat is effective against the valve plunger and upon the same forcing the latter slightly to the right liquid is admitted to the chamber surrounding the reduced portion 88 of the plunger. This fluid enters the chamber within the plunger through passages 89 and bears on the end of pin 83. The pressure is now also acting on the whole left end of the plunger so that the effective area for moving the plunger is equal to that annular area representing the difference between the total area of the plunger and that of pin 83. This is a larger area than that exposed in the bore of seat member 77 and the movement of the valve now proceeds to the second stage where more rapid opening is effected because of the greater effective area exposed to liquid pressure. Thus the plunger moves rapidly to uncover staggered radial passages 87 and deliver the liquid to low pressure chamber 73 to which the back end of the plunger is exposed. If this valve has any tendency to chatter whatsoever it is during the first stage, which lasts but momentarily.

In Fig. 6 it should be noted that sleeve or liner 90 is mounted in the same manner as in Fig. 2, but is provided with two sets of radial passages, one shown at 91 for cooperation with the radial bores 87' in the plunger and the other at 92 to permit entrance of low pressure fluid behind the plunger. Preferably the bores 87' are not staggered in this embodiment but the passages 91 are which gives the same results.

In Figs. 7 and 8 are given two illustrations of similar valves, the first being without and the second having the auxiliary sleeve or liner for the bore in the housing. An explanation of the construction and operation of Fig. 7 is believed to be adequate for the pair of these valves. Here the housing 100 provides a large chamber 101 accessible through high pressure inlet port 102. Into this chamber integral block 103 projects from one side of the housing, and this block is hollowed to provide low pressure chamber 104 accessible through port 105. The ends of the housing are bored and threaded to receive closure plugs 106 and 107. Block 103 is longitudinally bored for its full length by passage 108 which intersects chamber 104. This passage or bore receives with a sliding working fit the cylindrical plunger 109 having both ends exposed in chamber 101. The plunger is provided with tunnel or chamber 110 closed at the right end and opening through the left end to receive pressure pin 112 shown as loosely attached to the closure plug 106 and surrounded by spring 115 fitting over a boss at the left end of the plunger. This spring presses the plunger against stop 116 formed on closure plug 107. Under normal conditions high pressure fluid is excluded from the interior of the plunger, which is at all times connected to the low pressure chamber by radial bores 118. Another set of radial bores 120 extend from chamber 110 but are eclipsed by the walls of bore 108 until the valve is moved toward the left by the action of excess pressure, which is effective only on an area equivalent to that of pressure pin 112. For convenience, passages 120 are staggered or arranged in echelon, to be uncovered when the plunger moves to relieve excess pressure.

The valve of Fig. 8 is like that of Fig. 7 but is equipped with bore sleeve or liner 125, the exterior of which is exposed to the low pressure chamber 104. In order that the interior may be placed in connection with this chamber and at all times with the interior 110 of the plunger, large diameter radial ports 126 are provided arranged to always communicate with radial bores 118 in the valve plunger. The latter have their exterior ends counterbored as shown at 127 to insure cooperation in all positions of the plunger.

The several embodiments of the invention illustrate effective means for venting high pressure fluids to low pressure compartments in a simple manner with a minimum of noise and heating. Because of the different effective areas of the several plungers, valves of different types are better adapted for certain pressure ranges, but aside from these differences the valves function in substantially the same manner and with the same facility.

I claim:

1. In a valve device of the type described, in combination, a housing having an inlet for high pressure fluid and an outlet for low pressure fluid, a cylindrical valve plunger reciprocably mounted in a tunnel in said housing, a single passage connecting said inlet and outlet and having a port controllable by said plunger only, means biasing the plunger to complete port-closing position, said passage including a portion of a longitudinal bore in said plunger, said bore extending through one end of the plunger, a pin having a sliding fit in said bore and extending into engagement with the wall of the housing and means always exposing an effective external area of the plunger to unbalanced high pressure to move the same against said bias on occurrence of excess pressure to thereby vent the excess pressure through said passage and port to the outlet, said effective area being less than that of the cross-section of the plunger by an amount equal to at least the cross-sectional area of said pin.

2. The combination defined in claim 1 in which the biasing means is a helical expansion spring surrounding the portion of the pin outside of the plunger.

3. In a valve device of the type described, in combination, a housing having an inlet for high pressure fluid and an outlet for low pressure fluid, walls dividing said housing into an exhaust chamber connected to the outlet and a three part high pressure chamber connected to said inlet, a cylindrical bore in said housing intersecting the exhaust chamber and all three parts of the high pressure chamber, a reciprocable cylindrical valve in said bore and exposed to each part of said chambers, a biasing spring in one of said high pressure chambers to bias the valve to closed position, a single longitudinal passage connecting the exhaust chamber and the inlet chamber and extending in said valve from the spring end and always open to the low pressure chamber, a port for said passage closed by the wall of the bore when the valve is in closed position but exposed in one of the parts of the high pressure chamber when the valve is moved against said bias, a pin fixed in said housing and extending through the spring with a sliding working fit into the end of said passage to always close the same, the area of the valve end surrounding the pin being exposed in one of the high pressure chambers to assist the spring in closing the valve, the full area of the other end of the valve being exposed in another part of the high pressure chamber to open the valve upon excess pressure.

4. In a valve of the type described, in combination, a housing, walls dividing said housing into an exhaust chamber and a high pressure chamber, a cylindrical bore in said housing intersecting the exhaust chamber and the high pressure chamber, a reciprocable cylindrical valve in said bore and exposed to each of said chambers, a biasing spring in said high pressure chamber to bias the valve to closed position, a longitudinal passage extending in said valve from one end and always open to the low pressure chamber, a port for said passage closed by the wall of the bore when the valve is in closed position but exposed in the high pressure chamber when the valve is moved against said bias, a pin fixed in said housing and extending with a working fit into the end of said passage to always close the same, the full area of one end of the valve and the area of the valve end surrounding the pin being exposed in the high pressure chamber to provide for opening the valve upon occurrence of excess pressure.

5. In a valve of the type described, in combination, a housing, means dividing said housing into an inlet chamber and an outlet chamber, a cylindrical tunnel intersecting both said chambers, a reciprocable plunger in said tunnel extending into both chambers, a longitudinal bore in said plunger having a radial passage normally closed by the walls of the tunnel but exposed to the inlet chamber when the plunger is moved from normal position, a second radial passage connected to said bore and always in communication with the outlet chamber, a pin having a sliding fit in said bore and extending out of the end thereof opening into the inlet chamber, and being secured to the housing, a helical spring surrounding the portion of the pin outside of the plunger and biasing the plunger to said normal position, the full area of the opposite end of said plunger being exposed to the inlet chamber.

6. In a valve of the type described, in combination, a housing, means dividing said housing into an inlet chamber and an outlet chamber, a cylindrical tunnel intersecting both said chambers, a reciprocable plunger in said tunnel, a longitudinal bore in said plunger having a radial passage normally closed but exposed to the inlet chamber when the plunger is moved from normal position, a second radial passage connected to said bore and always in communication with the outlet chamber, a pin having a sliding fit in said bore and extending out of the end thereof opening into the inlet chamber, and the outer end of the pin being engaged against the housing wall, a helical spring surrounding the portion of the pin outside of the plunger and biasing the latter to said normal position and means at the opposite end of the plunger exposed to the pressure in the inlet chamber.

7. In a valve of the type described, in combination, a housing, walls dividing said housing into an exhaust chamber and a two part high pressure chamber, a cylindrical bore in said housing intersecting the exhaust chamber and all parts of the high pressure chamber, a reciprocable cylindrical valve in said bore and exposed to each part of said chambers, a biasing spring in one of said high pressure chambers to bias the valve to closed position, a longitudinal passage extending in said valve from the spring end and always open to the low pressure chamber, a port for said passage closed by the wall of the bore when the valve is in closed position but exposed in one of the parts of the high pressure chamber when the valve is moved against said bias, a pin fixed in said housing and extending through the spring with a working fit into the end of said passage to always close the same, the area of the valve end surrounding the pin being exposed in one of the high pressure chambers to assist the spring in closing the valve, the full area of the other end of the valve being exposed in another part of the high pressure chamber to open the valve upon excess pressure.

8. In a valve for relieving liquid under high pressure to a reservoir at low pressure, in combination, a housing of cast metal containing inlet and outlet chambers, a plunger having a longitudinal bore and a radial passage both adapted to conduct liquid when the valve is open, means to throttle the liquid at said passage whereby heat is generated, said plunger being formed of a metal having a higher coefficient of expansion than that of the housing, said housing having a cylindrical bore connecting said chambers, a sleeve in said cylindrical bore having a coaxial bore providing a close working fit for the said plunger and having a radial port from said last mentioned bore to one of said chambers, the sleeve being of a metal having a coefficient of expansion of the same order as that of the plunger and having a relatively loose fit in said cylindrical bore and sealing means between said sleeve and the walls of the cylindrical bore to prevent longitudinal movement of liquid therebetween.

9. In a valve for relieving liquid under high pressure to a reservoir at low pressure, in combination, a housing of cast metal containing inlet and outlet chambers, a plunger having a longitudinal bore and a radial passage both adapted to conduct liquid when the valve is open, means to throttle the liquid at said passage whereby heat is generated, said plunger being formed of a metal having a higher coefficient of expansion than that of the housing, said housing having a cylindrical bore connecting said chambers, a sleeve in said cylindrical bore having a coaxial bore providing a close working fit for the said plunger, the sleeve being of a metal having a coefficient of expansion of the same order as that of the plunger and having a relatively loose fit in said cylindrical bore, said sleeve having an external circumferential groove therein near the inlet end thereof, and a resilient ring laterally compressed in said groove so as to expand radially into sealing engagement with the walls of the cylindrical bore, said sleeve being ported for communication with one of said chambers.

10. In a valve for relieving high pressure liquid including in combination, a housing formed of cast metal to provide a chamber for high pressure liquid and a low pressure discharge chamber, a bore extending for most of the length of said housing, a sleeve or lining for said bore having a relatively loose fit therein and having openings communicating with said chambers, packings between the walls of the bore and the sleeve to prevent flow of liquid between openings in the space surrounding the sleeve in the bore, a plunger having a close working fit in the sleeve and adapted to be automatically positioned to throttle the flow of liquid through one of said openings whereby heat is generated, said plunger and lining being formed of the same metal which has a higher coefficient of expansion than that of the housing, means to normally position said plunger to close off communication between said chambers, means exposing one end of the plunger to the liquid in the high pressure chamber, and means partially opposing movement of the plunger by said high pressure whereby said means to normally position the plunger can be of less strength.

11. A valve for relieving high pressure liquid including in combination a high pressure chamber and a low pressure chamber, a cylindrical tunnel connecting said chambers, a plunger reciprocably mounted in said tunnel and normally closing the same, a longitudinal bore into said plunger from one end thereof, a pin having a working fit in said bore, extending out of said end and abutting a stop in the housing, a radial bore connected to said longitudinal bore and always in communication with one of said chambers, a second radial bore connected to the longitudinal bore and normally closed by the walls of the tunnel and adapted to be placed in communication with the other chamber, a spring surrounding said pin and biasing the plunger to a position to close the second radial bore, the end of said plunger opposite the pin being exposed to pressure in the high pressure chamber to move the plunger against said bias to place the second radial bore in communication with the other chamber to vent excess pressure.

12. The valve as defined in claim 11 in which the low pressure chamber is divided into two parts, one for communication with one of said radial bores and the other surrounding the pin receiving end of the plunger.

13. The valve of claim 11 in which there is a high pressure inlet, a valve seat separating the inlet from the high pressure chamber and having a small bore coaxial with said tunnel and a conical tip on the end of the plunger opposite the pin adapted to close said small bore under the action of the spring, said radial bore being always in communication with said high pressure chamber.

14. The valve of claim 13 in which a liner is provided for said cylindrical tunnel, said liner comprising a sleeve having a loose fit in the tunnel and a sliding fit with the plunger, said sleeve and plunger being formed of metals having the same order of coefficient of thermal expansion and the housing having a lower coefficient of expansion, a packing preventing leakage between one end of the sleeve and the tunnel walls and a radial passage through the sleeve to the low pressure chamber for cooperation with a radial bore in said plunger.

15. The valve as defined in claim 9 in which both ends of the sleeve are grooved and fitted with resilient rings laterally compressed in the grooves to expand radially into sealing and sleeve holding engagement with the walls of the cylindrical bore on opposite sides of the outlet chamber, both ends of the sleeve being exposed in the inlet chamber for longitudinal pressure balance.

WILLIAM T. STEPHENS.

REFERENCES CITED

The following references are of record in the file of this patent:

UNITED STATES PATENTS

| Number | Name | Date |
|---|---|---|
| 1,206,453 | Manly | Nov. 28, 1916 |
| 1,219,334 | Lower | Mar. 13, 1917 |
| 1,401,643 | Ravaz | Dec. 27, 1921 |
| 1,994,320 | McLaughlin | Mar. 12, 1935 |
| 2,035,954 | Focht | Mar. 31, 1936 |
| 2,193,504 | Antrim | Mar. 12, 1940 |
| 2,200,824 | Herman | May 14, 1940 |
| 2,234,932 | Schlaupitz | Mar. 11, 1941 |
| 2,286,027 | Towler | Jan. 9, 1942 |
| 2,290,080 | Wahlmark | July 14, 1942 |
| 2,308,753 | Hart | Jan. 19, 1943 |
| 2,317,332 | Rappl | Apr. 20, 1943 |
| 2,411,930 | Mathys | Dec. 3, 1946 |
| 2,468,079 | Kirkham | Apr. 26, 1949 |